Patented Sept. 4, 1928.

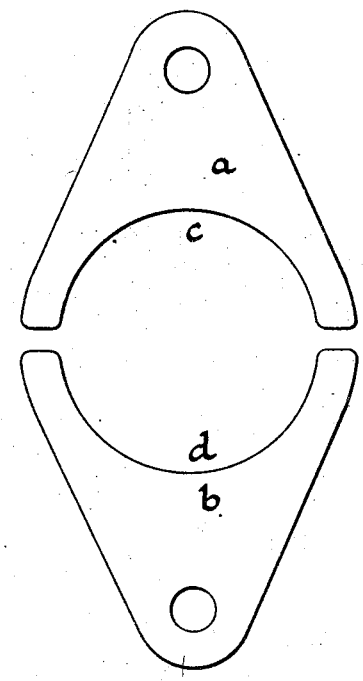
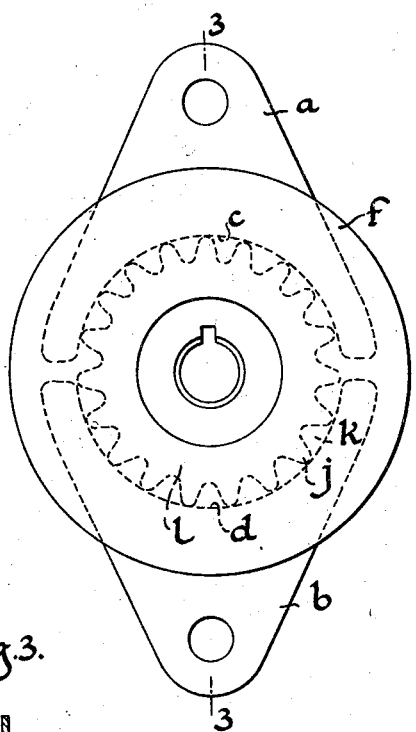
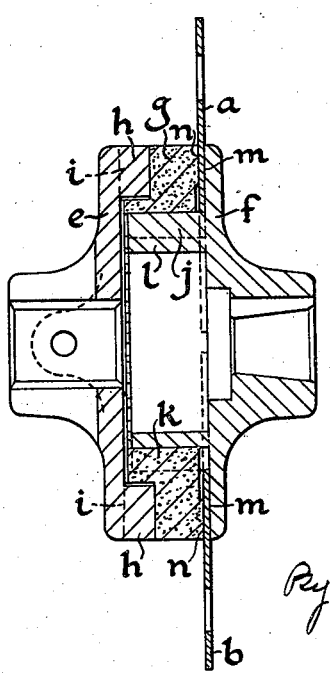

1,683,311

UNITED STATES PATENT OFFICE.

FREDERICK RICHARD SIMMS, OF LONDON, ENGLAND, ASSIGNOR OF ONE-HALF TO SIMMS MOTOR UNITS LTD., OF LONDON, ENGLAND.

TOOL OR APPLIANCE FOR FACILITATING THE MOUNTING OF SHAFT COUPLINGS.

Application filed August 25, 1927, Serial No. 215,434, and in Great Britain August 7, 1926.

This invention relates to a tool or device for facilitating the mounting or erecting of shaft couplings of the kind permitting small relative angular adjustment of the coupled shafts and comprising a pair of opposed metal discs secured, respectively, to the ends of the shafts to be coupled, with a metal or rubber ring between them, one of the discs having a ring of teeth on its face whilst the other disc has a ring of teeth on the periphery of a boss projecting from its face which is plain, the metal or rubber ring being provided with two sets of teeth, corresponding to, and engaging with, those of the two coupling discs and providing a plain face in juxtaposition to the plain face of the disc having the toothed boss.

These couplings are largely used in connection with internal combustion engines for coupling the magneto shafts to the engine shafts and in practice it is often found that the magneto is so positioned that the portion of the coupling on its shaft is pressed against the portion of the coupling on the engine shaft with the result that thrust is set up on the end bearing of the magneto which is objectionable.

The object of the invention is a tool or appliance by means of which such couplings can be fitted in place with a certain degree or amount of space or play between the members, and thus avoid the disadvantage referred to.

According to the invention the tool or device comprises a pair of metal plates of a thickness corresponding to the amount of space or play which it is desired shall be allowed between the members of the couplings when mounted, each of the said plates being provided at one end or edge with a semi-circular recess of a shape such that it can partly encircle the boss of the coupling part thereon.

In use, the recessed plates are passed around the said shaft or boss from opposite sides so as to form a practically complete plate or filling between the juxtaposed plain faces of one of the metal coupling discs and and the intermediate member. The coupling discs are then adjusted on their shafts, so that the said faces make contact with the two sides of the said plate and are secured in position, after which, the two plates are removed. By this means the members of the coupling are secured in position with the requisite space or play between the members thereof.

To enable the invention to be fully understood I will describe it by reference to the accompanying drawing, in which:—

Figure 1 is a face view of a tool or appliance made in accordance with the invention.

Figure 2 is an end view of a shaft coupling of the type above referred to with the tool applied thereto, and Figure 3 is a section on the line 3—3, Figure 2.

$a$ and $b$ are the pair of metal plates forming the improved tool or appliance and $c$, $d$ are the semi-circular recesses formed at one end of the said plates, respectively.

$e$, $f$ are the pair of opposed toothed metal discs engaging the intermediate metal or rubber ring $g$ forming the coupling, the space or play between which discs and ring is to be determined by the tool or appliance $a$, $b$ before securing the discs to their respective shafts, not shown. $h$ indicates the teeth on the face of the disc $e$ engaging corresponding teeth $i$ on the ring $g$, and $j$ indicates the teeth on the disc $f$ engaging corresponding teeth $k$ on the said ring $g$; the said teeth $j$ being formed on the extension or boss $l$ on the said disc $f$. $m$ and $n$ are the respective plain faces on the coupling disc $f$ and the ring $g$ and which are in juxtaposition as shown clearly in Figure 3, and between which the metal plates $a$ and $b$ are placed from opposite sides as shown, the semi-circular recesses $c$ and $d$ fitting around the boss $l$ on the disc $f$. The coupling discs $e$ and $f$ are then adjusted on their shafts so that the juxtaposed faces $m$, $n$ make contact with the plates $a$, $b$ and are then secured in position on the said shafts, the said plates being then removed from the coupling, the gap left between the faces $m$, $n$ affording the necessary space or play between the members of the coupling.

I claim:

A tool or appliance for facilitating the relative adjustment of the opposed members of shaft couplings of the kind referred to, comprising a pair of flat metal plates of a thickness corresponding to the amount of space or play desired between the said opposed members when mounted on the shafts to be coupled, and between which members, the said plates are inserted from diametrically opposite points, each of the plates being formed at one end with a semi-circular recess such that it can partly encircle a boss of the coupling part thereon.

FREDERICK RICHARD SIMMS.